United States Patent [19]

Dholakia

[11] 4,280,024
[45] Jul. 21, 1981

[54] SELECTIVELY DAMPED VIDEO DISC STYLUS ASSEMBLY

[75] Inventor: Anil R. Dholakia, East Windsor, N.J.

[73] Assignee: RCA Corporation, New York, N.Y.

[21] Appl. No.: 68,504

[22] Filed: Aug. 22, 1979

[51] Int. Cl.³ .............................................. G11B 3/38
[52] U.S. Cl. ..................................... 369/219; 360/77; 369/126; 369/170; 369/242
[58] Field of Search ................ 179/100.1 G, 100.3 V, 179/100.4 R, 100.4 D; 358/128.5, 128.6; 360/77; 274/37

[56] References Cited

U.S. PATENT DOCUMENTS

| 1,578,645 | 3/1926 | Craft | 179/100.4 R |
|---|---|---|---|
| 2,478,223 | 8/1949 | Argabrite | 310/312 |
| 3,006,652 | 10/1961 | Mankovitz | 274/23 A |
| 3,711,641 | 1/1973 | Palmer | 360/78 |
| 3,787,616 | 1/1974 | Falk et al. | 360/36 |
| 3,842,194 | 10/1974 | Clemens | 179/100.1 G |
| 3,873,783 | 3/1975 | Leedom | 179/100.4 R |
| 3,917,903 | 11/1975 | Taylor et al. | 179/100.1 G |
| 3,956,581 | 5/1976 | Taylor | 179/100.1 G |
| 3,963,861 | 6/1976 | Crooks | 179/100.1 G |
| 3,963,864 | 6/1976 | Fuhrer | 179/100.1 G |
| 3,993,863 | 11/1976 | Leedom | 358/128.5 |
| 4,030,123 | 6/1977 | Taylor et al. | 179/100.1 G |
| 4,049,280 | 9/1977 | Leedom | 274/37 |
| 4,063,285 | 12/1977 | Nagaoka | 179/100.1 G |
| 4,077,050 | 2/1978 | Dholakia | 179/100.1 G |
| 4,124,217 | 11/1978 | Tajima | 274/37 |
| 4,164,756 | 8/1979 | Toda et al. | 358/128.6 |
| 4,170,783 | 10/1979 | Tajima | 179/100.1 G |

Primary Examiner—John H. Wolff
Assistant Examiner—Donald McElheny, Jr.
Attorney, Agent, or Firm—E. M. Whitacre; J. S. Tripoli; E. P. Herrmann

[57] ABSTRACT

A stylus assembly for damping impulsive radial motion of the stylus during playback of a grooved video disc record. Included in the stylus assembly is a moment arm perpendicularly attached at the free end of the stylus arm and parallel to the disc record when the stylus is engaged for playback. A mass is mounted to the moment arm to contribute increased inertia to lateral motion of the stylus only in a direction radially across the record. The mass is designed to permit tracking a record groove in the presence of groove eccentricity but to resist motion due to impulsive forces imparted by record defects or particulate matter thereon.

13 Claims, 7 Drawing Figures

SELECTIVELY DAMPED VIDEO DISC STYLUS ASSEMBLY

This invention relates to stylus assemblies for use with spiral grooved records having relatively shallow closely spaced grooves such as certain types of video discs for example.

In high density recording systems, as for example a video disc system, video information is recorded by means of geometric variations in the bottom of a smooth spiral groove on the surface of a disc record. The record bulk comprises a conductive material which is covered by a thin layer of dielectric material. A pickup stylus, supported at one end of a stylus arm, engages the spiral groove and includes a conductive electrode which establishes a capacitance with the conductive material and the dielectric layer of the record. When the record is rotated, the stylus/record capacitance varies in response to the geometric variations in the bottom of the spiral groove. The capacitance variations are converted to electrical signal variations by suitable signal processing circuitry coupled to the stylus electrode. The output signal of the signal processing circuitry may be coupled to a conventional television receiver for reproduction. The other end of the stylus arm is releasably secured to a stylus arm carriage of the playback system. A system of the aforementioned type is described in detail in U.S. Pat. No. 3,842,194, issued to J. K. Clemens, and entitled, "INFORMATION RECORDS AND RECORDING/PLAYBACK SYSTEMS THEREFOR".

Typically, the pitch between the spiral grooves in such systems is extremely small, in the order of a few microns. As a practical result, the groove depth is relatively shallow, too shallow to reliably provide sufficient radial forces to impart transitory motion of the pickup stylus carriage across the record. Therefore, a drive mechanism is arranged to translate the carriage, and thereby the stylus, radially at a uniform rate synchronized with the rotation of the record, which uniform rate is chosen to maintain the stylus in the center of the groove. However, if the apparent spiral grooves are not substantially circular due to warpage of the record, or misalignment of the grooves with the center of the record, etc., the stylus will move off-center to the sides of the groove and be subjected to radial forces.

To insure that the stylus continuously tracks the groove in the presence of the radial forces, the stylus is mounted on a support arm that is pivotally mounted to provide compliance to lateral or radial motion across the record and to vertical motion. The vertical compliance permits the stylus to track a warped disc. The lateral compliance is provided to permit tracking an eccentric spiral groove and to reduce both record and stylus wear due to bearing forces generated by the disc eccentrically. The degree of lateral compliance afforded the support, or stylus arm, is such that if a stylus is ejected vertically out of the groove, it will undergo virtually no lateral movement for fifty to 100 microseconds even if the stylus arm were initially deflected from its normal or relaxed position.

However, because of the high degree of compliance the stylus is susceptible to sudden lateral movement if it encounters a foreign particle or defect on the disc sufficient to eject it from the groove. Under such conditions the stylus may be displaced to a groove previously traversed (locked groove condition) and a portion of the information is replayed (a particularly undesirable condition), or the stylus may be displaced toward the record center (skipped groove condition).

The present invention alters the lateral dynamics of the stylus arm without substantially affecting its compliance to tracking motion either vertically or laterally. A substantially perpendicular extension is attached at the stylus end of the stylus arm. The extension is mounted parallel to the surface of the record such that radial or lateral motion of the stylus imparts longitudinal motion to the extension. The extension thereby provides additional lateral inertia to the stylus assembly which, when mechanically tuned to the oscillatory frequency generated by the groove eccentricity and disc rotation, will freely track an eccentric groove but resist abrupt lateral movement imparted by defects.

Figure 1:
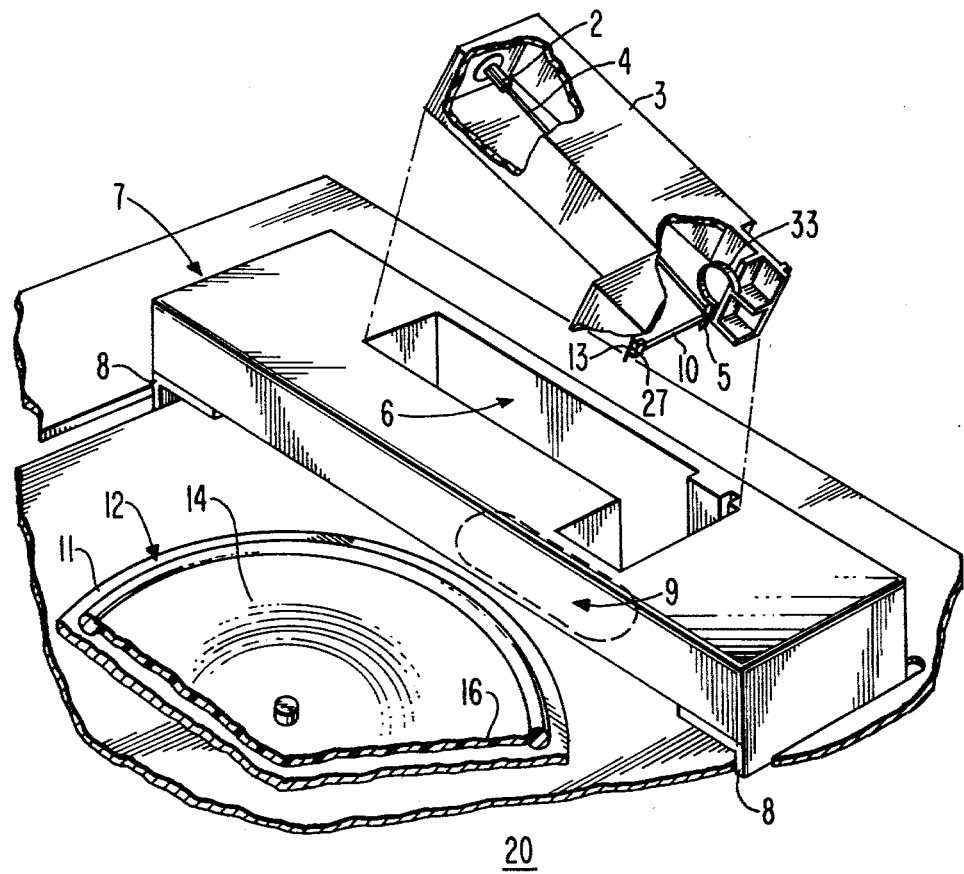
FIG. 1 is a partial perspective view of a video disc playback system incorporating a cartridge having a pickup arm provided with a lateral extension assembly embodying the present invention.

With reference to FIG. 1, a video playback system 20 includes an "L" shaped cartridge 3 enclosing a primary stylus arm 4, the free end of which is attached to a stylus 5 having fly lead 33 for making electrical connection thereto. A moment arm 10, with mass 27 attached thereto is pivotally attached at the free end of stylus arm 4, and has its free end suspended from cartridge 3 by filament 13. The moment arm is generally perpendicular to stylus arm 4 and horizontal to record disc 11 when stylus 5 is engaged for playback.

The cartridge 3 is received in a compartment 6 of a box-like carriage 7 which is mounted to a support member 8 for movement between a standby position and playback positions. During playback, the stylus 5 passes through an opening 9 in a bottom wall of the carriage 7. Support member 8 is driven by a radial drive feed mechanism illustratively of a type described in U.S. Pat. No. 3,870,835, for F. R. Stave.

The player system 20 further includes a turntable 11 supporting a video disc record 12 of a type having video information recorded by means of geometric variations (not shown) in a spiral groove 14 on the surface thereof. The record 12, which may be of the type shown in the aforementioned Clemens patent, includes a thin dielectric 16 covering a conductive material which is disposed on the grooved surface of the disc.

In high frequency density record systems the spiral groove 14 contained on disc 11 is constrained to an extremely small pitch, in the order of several micrometers. The small pitch limits the depth of the groove to relatively shallow dimensions. The shallowness of the groove complicates its being tracked by the stylus for lack of sufficient bearing surface area between the stylus and the grooves. Tracking is further complicated by eccentricity of the groove relative to the center of rotation of the disc. Thus the stylus arm assembly must be relatively compliant to lateral motion to accomplish continuous tracking in view of the eccentricity. In certain systems the compliance is exaggerated beyond that necessary to avoid stylus and/or record wear. Stylus assemblies, assembled with such exaggerated compliance are susceptible to ballistic-like motion if the stylus encounters foreign matter or defects on the disc.

In order to reduce undesirable lateral motion of the stylus caused by disc defects or particulate matter, the present stylus assembly has its lateral inertia affected by a moment arm either directly to the stylus, or, in the area of the free end of the stylus arm. By increasing the lateral inertia of the stylus assembly, the stylus can be made to track the run-out or eccentricity of the groove but be resistive to impulsive forces, relative to the frequency of disc rotation.

It has been found that it is not practical to increase the stylus assembly inertia by simply adding mass to the stylus arm for at least three reasons: first, the added mass inhibits reliable tracking in the presence of a warped disc; second, the added mass increases the disc and stylus wear; third, since the bearing surface of the stylus is small and the stylus arm is typically attached to the stylus at a distance above the bearing surface the mass tends to cause a twisting of the stylus.

Figure 2A:
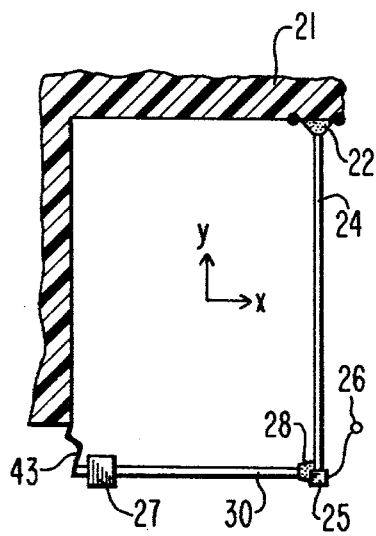
FIGS. 2A and 2B are respective diagrammatic plan and end views of a particular stylus arm assembly embodying the present invention.
Figure 2B:
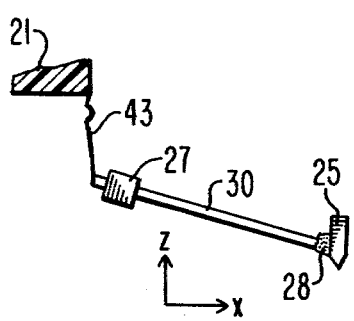

The FIG. 2 apparatus illustrates a stylus assembly which applies additional lateral inertia to the stylus without appreciable twisting of the stylus or increasing the load on the bearing surface.

In the FIG. 2 apparatus, a pickup stylus 25 is rigidly attached to the free end of the stylus-support arm 24. Stylus 25 is contoured for reception in the disc groove and is provided with flylead 26 for making electrical contact thereto. Stylus arm 24 is a rigid member of low mass providing low inertial resistance to movement of the stylus. Stylus arm 24 is coupled to support housing 21 by a compliant member 22. The housing 21 may be part of a cartridge body for insertion in a carriage as in the FIG. 1 apparatus or may be part of the carriage per se. In either case housing 21 is a part of the mechanism for radially translating the stylus across the record disc.

The compliant coupling 22 permits movement of the free end of the stylus arm in at least the x and z dimension. Movement of the stylus in the x dimension corresponds to radial translation across the record. Movement of the stylus in the z dimension relates to the engagement of stylus and record, i.e., it is normal to the plane of the disc. Movement in the y dimension corresponds to longitudinal translation of the stylus along the record groove.

Moment arm 30, which is a rigid member, has a first end pivotally attached to the stylus/stylus arm by compliant coupling 28. The second end of arm 30 is suspended by filament 43, e.g., a polymer fiber, from the support housing to position it either parallel or at a slight angle to the disc when the stylus is engaged in the disc groove.

Compliant coupling 28 which may be rubber or plastic cemented between moment arm 30 and stylus 25, or cemented between moment arm 30 and the free end of stylus arm 24, allows pivotal motion of moment arm 30 about the stylus/stylus arm so that arm 30 introduces substantially no resistance to movement of the stylus/stylus arm in the y and z dimensions.

Considering that groove eccentrically will generally be maintained to a relatively small dimension, e.g., ±0.005″ (0.013 cm) and that the eccentricity limit will be of the order of the maximum movement required of the stylus with respect to support housing 21 the constraints on the compliance of couplings 22 and 28 are relatively relaxed.

Ideally, moment arm 30 and compliant coupling 28 should add no weight or mass at the stylus which would tend to increase the bearing forces and thus the wear between the stylus and the groove. To this end moment arm 30 should be of low density construction such as tubular aluminum. A mass 27 is added to 30 at a point distant from stylus 25 and near to the support filament 43 so that the filament bears the forces imparted by the mass in the z direction. Mass 27 has little effect on the y and z movement of the stylus. With respect to motion in these directions, the mass 27 is effectively at the fulcrum (43) of a lever (30) and is therefore disposed to undergo very small motion for a given displacement of the stylus, thereby contributing essentially no inertia to the stylus/stylus arm. On the other hand, a radial translation of the stylus (in the x direction) effects an equal translation of the mass 27 by virtue of the rigidity of moment arm 30. Thus mass 27 contributes to the radial inertia of the stylus.

The constraints on the system require that the stylus tracking accommodate the groove eccentricity but be insensitive to impulsive radial motion as might be imparted to the stylus by encounters with defects or foreign particulate matter in the groove. Considering a 12″ disc rotating at 450 rpm, the frequency of oscillatory motion due to eccentricity is simply 450/60=7.5 hz. The time constant of response in the radial dimension must therefore be less than 0.133 sec. The maximum free flight of the stylus upon being ejected from the groove should be less than 63 microseconds, corresponding to one TV line in video systems. The obvious disparity between the eccentricity cycle time and the errant flight time of the stylus results in a wide design margin wherein sufficient mass can be employed to restrict impulsive radial translation yet freely permit tracking the eccentric groove. It should be noted that the system can be mechanically tuned to the frequency of oscillatory motion due to the eccentricity since the frequency is constant regardless of the degree of eccentricity. Where such tuning is effected, the stylus will experience a minimum of lateral forces thereby reducing wear. It has been found, however, that satisfactory operation may be achieved without resort to such tuning.

Figure 3A:
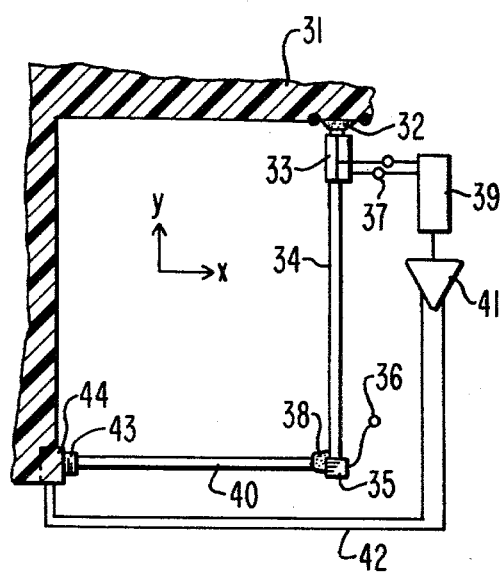
FIGS. 3A and 3B are respective diagrammatic plan and end views of a stylus arm assembly embodying the present invention and incorporating active means for controlling the stylus position.
Figure 3B:
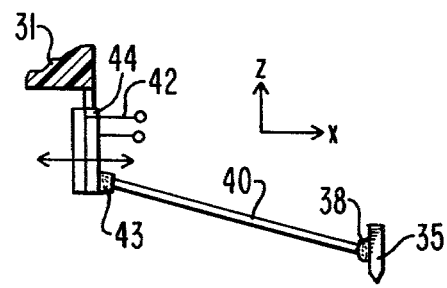
Figure 3C:
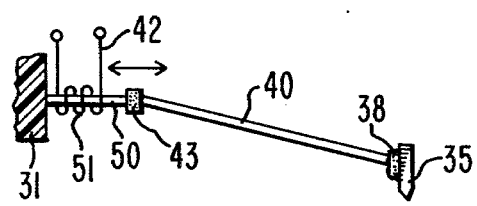
FIG. 3C is an end view of a further embodiment of the stylus assembly of FIG. 3A.

The apparatus of FIGS. 3A-3C show mechanisms for actively controlling the inertial dynamics to lateral motion of the stylus 35. The FIG. 3 apparatus is similar to that of FIG. 2 in that a stylus 35 is rigidly attached to stylus arm 34 with stylus arm 34 coupled to support housing 31 via compliant coupling 32. A moment arm 40 is pivotally connected substantially normal to the stylus arm longitudinal axis in the play position and suspended from the support housing at its other end by connecting means 44. The connecting means 44 is attached to moment arm 40 by compliant coupling 43 to allow pivotal motion thereabout in the y and z dimension but to faithfully couple lateral motion, i.e., in the x dimension, between connecting means 44 and moment arm 40. In contrast to the FIG. 2 apparatus, the moment arm 40 of FIG. 3 does not include the additional passive mass to increase the inertia to lateral motion. The connecting means 44 rigidly secured to the support housing 31 imparts resistance to lateral motion responsive to a control signal applied to its control terminals 42. The control signal is generated by a transducer 33 having output signal terminals 37 and attached as an integral part of stylus arm 34. Tranducer 33 is sensitive to bending moments produced by relative lateral motion of the stylus with respect to the support housing.

The signal from the transducer 33 is applied to a low pass filter 39, the output signal of which is attenuated for frequencies higher than the oscillatory frequency imparted by the groove eccentricity. The signal from filter 39 is applied to amplifier 41 to create the requisite control signal to drive the means 44. The transducer 33, filter 39, and amplifier 41, and connecting means 44 thus provide dynamic impedance to lateral motion of the stylus for bending moments sensed by transducer 33 having a frequency spectrum substantially exceeding the rotation frequency of the disc and assistance to lateral motions occurring at a rate less than a prescribed frequency near the rotation frequency of the disc.

The transducer 33 may be implemented with a bimorph or a strain gage arranged to respond to lateral bending stress in the stylus arm 34. These devices may be fixedly attached along the sides of a contiguous arm 34 or may be integrally interposed in tandem therewith. The connecting means 44 on the other hand can also be implemented with a bimorph as diagrammatically illustrated in FIG. 3B or with a linear motor such as a solenoid or speaker coil assembly as illustrated in FIG. 3C. A linear motor of the type implemented in the FIG. 3C apparatus is described in U.S. Pat. No. 3,711,641 issued Jan. 16, 1973 to R. C. Palmer and entitled, "Velocity Adjusting System".

Figure 4:
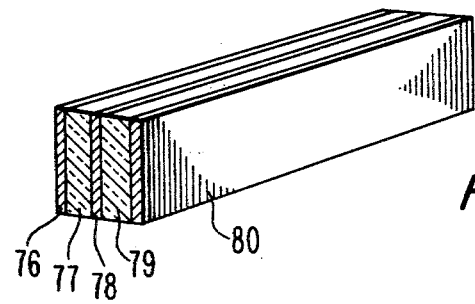
FIG. 4 is a view of a piezoelectric bimorph of the type used as the transducer or connecting means of FIG. 3A or 3B.

A bimorph of the type for use as transducer 33 and/or connecting means 44 is illustrated in FIG. 4. A bimorph or bending mode structure is made from the apparatus illustrated in FIG. 4 by properly polarizing piezoelectric elements 77 and 79. Elements 77 and 79 are polarized by first applying an electrical potential of the same polarity to metal layers 76 and 80 with a common electrical return connection to metal layer 78. The piezoelectric and metal structure is thereafter placed in an environment of elevated temperature. The particular temperature required to make the structure bimorph is the Curie temperature of the piezoelectric material. When the piezoelectric structure is properly cooled, the piezoelectric elements become polarized and the potentials applied to the metal layers 76, 78 and 80 are removed. The resultant polarization is such that element 77 is the opposite polarity from that of elements 79 with respect to the outer metal layers 76 and 80. Thereafter, by applying an appropriate potential across metal layers 76 and 80, one of the piezoelectric elements will contract and the other expand causing the entire bimorph structure to bend, when one end of the structure is secured, in a direction dictated by the polarity of the applied potential. By applying a particular potential of given polarity across metal layers 76 and 80, a bending motion of the bimorph element is implemented. Conversely, a sensing bimorph is formed of a piezoelectric material which provides an electrical output signal in response to bending forces applied thereto. Such materials are well known in the art and a detailed description thereof will not be included here.

What is claimed is:

1. A signal pickup assembly for use with a record disc having an information bearing spiral groove, said assembly comprising:
    a signal pickup stylus contoured for reception within the spiral groove;
    a support housing having a compliant member attached thereto;
    a stylus arm having a first end at which said stylus is attached and a second end attached to the compliant member for providing limited unrestrained movement of the stylus in at least two dimensions, said stylus arm being substantially parallel with the tangent to the groove at the point of stylus contact when the stylus is operatively tracking the spiral groove;
    a longitudinal rigid member of relatively low density having a first end connected to the stylus arm proximate the first end of the stylus arm and having a second end, said rigid member being positioned substantially perpendicular to said stylus arm;
    a member of relative high density rigidly attached near the second end of the longitudinal rigid member for increasing the inertial mass of the stylus and stylus arm combination to resist radial movement of the stylus due only to impulsive forces imparted to the stylus; and
    means for connecting the second end of the longitudinal rigid member to the support housing such that the rigid member is approximately parallel to the plane of the disc when the stylus is engaged with the groove.

2. A signal pickup assembly for use with a record disc having an information bearing spiral groove, said assembly comprising:
    a signal pickup stylus contoured for reception within the spiral groove;
    a support housing having a compliant member attached thereto;
    a stylus arm having a first end at which said stylus is attached and a second end attached to the compliant member for providing limited unrestrained movement of the stylus in at least two dimensions, said stylus arm being substantially parallel with the tangent to the groove at the point of stylus contact when the stylus is operatively tracking the spiral groove;
    a moment arm having a first end pivotally connected to the stylus arm in the area of the first end of the stylus arm, said moment arm being positioned substantially perpendicular to said stylus arm and having a second end; and
    means connecting the moment arm to the support housing including a transducer responsive to control signals for imparting longitudinal motion to the moment arm and thereby motion to the stylus radially across said disc.

3. A pickup assembly as set forth in claim 2 wherein the transducer comprises a bimorph having a control terminal for applying control potential thereto, having a first end rigidly attached to the support housing and a second end pivotably attached to the second end of the moment arm.

4. A pickup assembly as set forth in claim 2 wherein the transducer comprises:
    a permanent magnet;
    an electric coil disposed adjacent to the magnet for generating relative motion therebetween responsive to control current flowing in said coil;
    means connecting a first one of said coil and said magnet to the support housing; and
    means connecting the other of said coil and said magnet to the moment arm for imparting longitudinal motion to the moment arm responsive to control current flowing in the coil.

5. A pickup assembly as set forth in claim 2 wherein the stylus arm includes a further transducer for detecting lateral bending moments in said stylus arm and for providing a signal in response thereto at an output terminal; and circuitry responsive to a prescribed range of signal frequencies generated by the further transducer for generating a control signal, said control signal being applied to the transducer connecting the moment arm for impeding impulsive lateral motion of the stylus having frequency content substantially above the range of frequency at which the disc rotates and assists lateral motion of the stylus occurring in the range of frequency at which the disc rotates.

6. A pickup assembly as set forth in claim 5 wherein the further transducer comprises a bimorph arranged to detect bending of the stylus arm in a prescribed direction.

7. A video disc stylus-disc arm assembly comprising:
a signal pickup stylus secured to the first end of a rigid stylus arm, the second end thereof being compliantly mounted to a support housing;
a rigid moment arm having a first end secured to the stylus arm proximate the first end thereof, said moment arm arranged substantially normal to the stylus arm and substantially parallel to the plane of a record disc in normal operating condition and having a second end, and wherein the mass of the rigid moment arm is arranged to affect the radial inertia of the stylus arm without substantially affecting the dynamics of the stylus arm toward and away from said record disc; and
means for supporting the second end of the moment arm, which means is connected to the support housing, and allows limited longitudinal movement of the moment arm.

8. A video disc stylus-stylus arm assembly as set forth in claim 7 wherein the means for supporting the second end of the moment arm is a flexible fiber filament connected between the second end of the moment arm and the support housing.

9. A video disc stylus-stylus arm assembly comprising:
a signal pickup stylus secured to the first end of a rigid stylus arm, the second end thereof being compliantly mounted to a support housing;
a longitudinal rigid member of relatively low density having a first end secured to the stylus arm proximate the first end thereof by a compliant coupling and having a second end, said rigid member arranged substantially normal to the stylus arm and substantially parallel to the plane of a record disc engaged by said signal pickup stylus in a normal operating condition;
a member of relatively high density rigidly attached near the second end of the longitudinal rigid member for increasing the inertial mass of the stylus and stylus arm combination to resist radial movement of the stylus due only to impulsive forces imparted to the stylus; and
means for supporting the second end of the moment arm, which means is connected to the support housing, and allows limited longitudinal movement of the moment arm.

10. A video disc stylus-stylus arm assembly comprising:
a signal pickup stylus secured to the first end of a rigid stylus arm, the second end thereof being compliantly mounted to a support housing;
a rigid moment arm having a first end secured to the stylus arm proximate the first end thereof by a compliant coupling, said moment arm arranged substantially normal to the stylus arm and substantially parallel to the plane of a record disc engaged by said signal pickup stylus in a normal operating condition and having a second end;
means for supporting the second end of the moment arm including a transducer responsive to control signals for imparting longitudinal motion to the moment arm and thereby motion to the stylus radially across the record disc.

11. A video disc stylus-stylus arm assembly as set forth in claim 10 wherein the transducer comprises a bimorph having a control terminal for applying control potential thereto, said bimorph being mounted between the support housing and the second end of the moment arm for imparting longitudinal motion to the moment arm responsive to said control potential.

12. A video disc stylus-stylus arm assembly as set forth in clam 10 wherein the transducer comprises:
a permanent magnet;
an electric coil disposed adjacent to the magnet for generating relative motion therebetween responsive to control current flowing in said coil;
means connecting a first one of said coil and said magnet to the support housing; and
means connecting the other of said coil and said magnet to the longitudinal moment arm for imparting longitudinal motion to the moment arm responsive to control current flowing in the coil.

13. A video disc stylus-stylus arm assembly as set forth in claim 10 including a further transducer attached to the stylus arm for detecting lateral bending moments in said stylus arm and for providing a signal in response thereto at an output terminal; and circuitry responsive to a prescribed range of signal frequencies generated by the further transducer for generating a control signal, said control signal being applied to the transducer connecting the moment arm for impeding impulsive lateral motion of the stylus having frequency content substantially above the range of frequency at which the disc rotates and assists lateral motion of the stylus occurring in the range of frequency at which the disc rotates.

* * * * *